July 12, 1960     B. C. STUPP     2,944,417
APPARATUS FOR MAKING FRICTION TESTS
Filed April 4, 1957
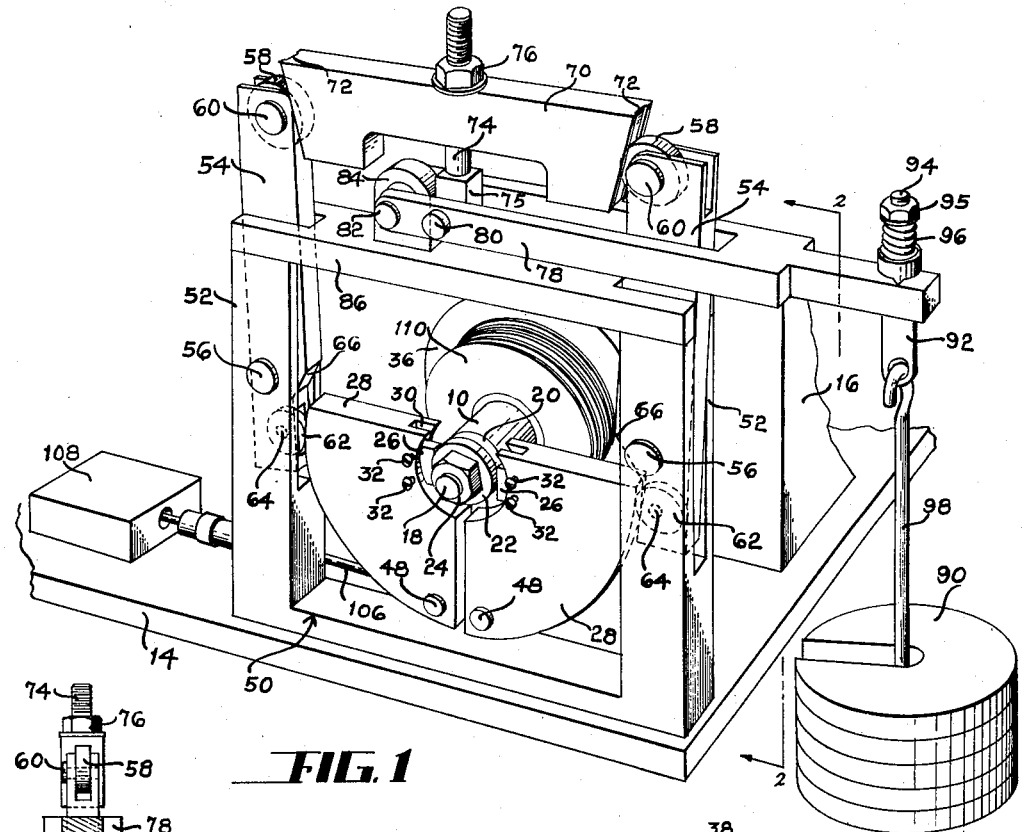
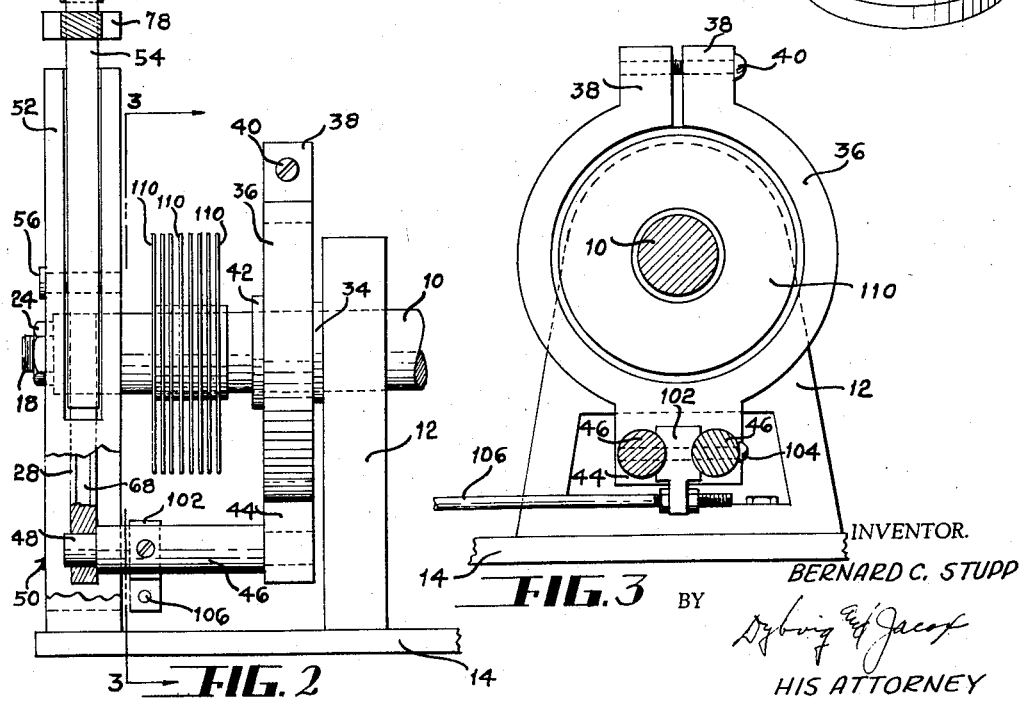
INVENTOR.
BERNARD C. STUPP
BY
HIS ATTORNEY

United States Patent Office 2,944,417
Patented July 12, 1960

2,944,417

APPARATUS FOR MAKING FRICTION TESTS

Bernard C. Stupp, 814 Vermont Ave., Dayton, Ohio

Filed Apr. 4, 1957, Ser. No. 650,661

8 Claims. (Cl. 73—9)

This invention relates to an apparatus for making friction tests and more particularly to an apparatus for continuously measuring the coefficient of sliding friction of a test surface over long periods of time, although the invention is not necessarily so limited.

The present apparatus has been developed specifically for use in measuring the coefficient of sliding friction of chemically treated metallic surfaces, the objective being to devise an apparatus which will accurately measure the coefficient of sliding friction of the test surface while the surface is simultaneously subjected to a life test. The apparatus described hereinbelow fulfills these specific objectives, however, it will become apparent from the following description that the particular apparatus developed may be utilized for making numerous other tests of a character different from the specific tests described herein.

An object of this invention is to provide an apparatus for continuously measuring the coefficient of sliding friction of a test surface, the device being so constructed and arranged that the measurement of the coefficient of sliding friction may be made without movement of the surfaces engaged in sliding contact from their normal wear pattern.

Another object of this invention is to provide an apparatus for continuously measuring the coefficient of sliding friction of a test surface, which apparatus may be simultaneously employed to frictionally rub a specially treated surface to the point of total destruction of the treated surface.

Still another object of this invention is to provide an apparatus for measuring the coefficient of sliding friction of the surface of a cylindrical bearing race wherein the race is rotated by a suitable mechanism and simultaneously subjected to radially directed forces for the purpose of subjecting the surface to frictional wear, the construction and arrangement being such that these radially directed forces are balanced with respect to the axis of rotation of the bearing. With such construction, the shaft for supporting and rotating the bearing is not subjected to unbalanced forces tending to produce a bending moment.

Still another object of this invention is to provide an apparatus for measuring the coefficient of sliding friction of a cylindrical bearing race wherein the race is rotated and simultaneously subjected to frictional wear produced by rub shoes compressively engaging the periphery of the race at diametrically opposed points, the apparatus including means for applying equal and opposite radially directed forces to the diametrically opposed rub shoes, the construction and arrangement being such that the rub shoes while being subjected to equal and opposite opposing forces are given limited freedom of rotation about an axis coaxial with respect to the axis of rotation of the race, thereby enabling direct measurement of the coefficient of sliding friction of the test race.

A further object of this invention is to provide, in an apparatus for measuring the coefficient of sliding friction of a test surface, means for dissipating the heat generated as a result of sliding friction contact.

Other objects and advantages reside in the construction of parts, the combination thereof, the method of manufacture and the mode of operation, as will become more apparent from the following description.

In the drawing,

Figure 1 is a perspective view, with parts broken away, illustrating the friction testing apparatus.

Figure 2 is a sectional view, with portions broken away, taken substantially along the section line 2—2 of Figure 1.

Figure 3 is a sectional view, with portions broken away, taken substantially along the section line 3—3 of Figure 2.

Referring to the drawing in greater detail, the test apparatus, as best illustrated in Figure 2, includes a shaft 10 supported for rotation by a journal block 12 mounted upon a supporting base 14. A suitable means, as, for example, an electric motor housed within the housing 16, illustrated in fragmentary detail in Figure 1, is employed for rotating the shaft 10 at a predetermined speed.

As best seen in Figure 1, the shaft 10 terminates in a threaded portion 18 adapted to receive a test race 20 which is secured to the shaft 10 by means of a collar 22 locked in place by a suitable nut 24.

As noted hereinbefore, the present apparatus has been developed for measuring continuously the coefficient of sliding friction of a test surface represented by the test race 20. For example, the test race 20 may be a Standard Timken cup, T-54148, manufactured by the Timken Roller Bearing Co., Canton, Ohio, the surface of which has been treated chemically or physically for the purpose of reducing the coefficient of friction of that surface, as by applying a dry film lubricant to the surface. In such cases, the objectives of the test would ordinarily be (a) to measure the coefficient of sliding friction of the test surface in the presence of controlled variables such as sample history, temperature, and atmosphere and (b) to ascertain the total useful life of the test surface in the presence of these variables. To accomplish these objectives, the following apparatus is employed for subjecting the surface of the test race to frictional wear.

As illustrated in Figure 1, a pair of rub shoes 26 are supported in engagement with the test race 20, at diametrically opposed positions relative to the axis of rotation of the shaft 10, by holders 28 disposed in a plane normal to the axis of rotation of the shaft 10. These holders 28 are essentially sectors of a flat annulus or toroid having an inner diameter somewhat larger than the diameter of the shaft 10 and an outer diameter materially greater than the diameter of the shaft 10. Each holder 28 is provided with a groove 30 along the inner periphery thereof adapted to receive the rub shoe 26. Suitable screws 32 are employed to anchor the rub shoe within the holder. The illustrated rub shoes 26 are provided with flat surfaces for engaging the test race 20, however, it is within the scope of this invention to provide the rub shoes with arcuate surfaces, such that a conforming contact area may be established between the rub shoes 26 and the test race 20.

The holders 28 are supported as follows. Mounted upon a bearing 34 adjacent the journal block 12, as shown in Figure 2, is a split ring clamp 36 provided with lugs 38 adapted to be engaged by a suitable screw 40 for the purpose of tightening the clamp to the bearing 34. A lock nut 42 retains the clamp 36 in spaced relation to the journal block 12. The clamp 36 is provided with a projection 44 having spaced apertures adapted to receive parallel rods 46, these rods 46 extending parallel to the shaft 10 in spaced relation thereto.

The rods 46 terminate in reduced portions 48 journalled into suitable apertures in the holders 28, such that these holders 28 are pivotally supported by the rods 46 in spaced relation to the clamp 36. In this manner, the holders 28 are supported for free rotation relative to the shaft 10, each holder 28 being further free to pivot a limited amount about the rods 46.

A compressive force is applied to the rub shoes 26 engaging the test race 20 by the following mechanism. Secured to the base 14 in coplanar relation with the holders 28 is a yoke 50 having bifurcated arms 52. A lever 54 is pivotally secured in the bifurcated portion of each arm 52 by means of a pin 56. Each lever 54 is provided with opposite bifurcated end portions, the upper ends of the levers 54 supporting bearings 58 journalled upon shafts 60, and the lower ends of the levers 54 supporting bearings 62 journalled upon shafts 64. The arrangement is such that the bearings 62 mounted in the lower ends of the levers 54 engage and ride upon the outer peripheries of the holders 28, these bearings 62 engaging the holders 28 at diametrically opposed positions with respect to the axis of rotation of the shaft 10. The peripheries of the holders 28 may be channeled at 68, as best seen in Figure 2, to provide races for the bearings 62. As best seen in Figure 1 the levers 54 are recessed at 66 to enable unrestricted rotation of the holders 28 for a limited distance about the shaft 10.

As shown in Figure 1 a trapezoidal wedge 70 is nested between the bearings 58 located at the upper ends of the levers 54. This wedge 70 is provided with off-set grooves 72 in the tapered sides thereof, providing races for the bearings 58. A shaft 74 traverses the center of the wedge 70 and is secured thereto by a nut 76. The shaft 74 terminates in a bearing portion 75 pivotally secured to a transverse forked lever 78 by means of a pin 80. The forked lever 78 is pivotally secured by a pin 82 to a fulcrum block 84, the fulcrum block 84 being anchored to a cross-bar 86 rigidly secured to the ends of the arms 52 of the yoke 50. As illustrated in Figure 1, the cross-bar 86 has bifurcated end portions providing clearance for the levers 54.

The end of the forked lever 78 opposite the fulcrum block 84 is adapted to receive a series of weights 90. The weights 90 are secured to the forked lever 78 by means of a hanger 92 provided with a shaft 94 journalled loosely into the end of the forked lever 78 and secured thereto by a nut 95. A compression spring 96, coacting between the nut 95 and the forked lever 78, provides a resilient connection between the hanger 92 and the forked lever 78. The weights 90 are attached to the hanger 92 by means of a conventional weight carrier 98.

It is apparent that as each weight is added to the carrier 98, the force exerted by the weight is amplified first by the forked lever 78, second by the wedge 70, and third by the levers 54, such that the force applied to the holders 28 through the bearings 62 is many times greater than the magnitude of the force initially supplied by the weight. This amplified force is transmitted through the holders 28 and the rub shoes 26 to the test race 20. In view of this substantial force amplification, there is a danger of peening of the test surface each time a weight is added to the carrier 98. It is found that the risk of peening is materially reduced by providing the resilient connection between the hanger 92 and the lever 78.

It is to be noted that the foregoing lever assembly equally partitions the force exerted by the weights 90, such that the individual rub shoes 26 receive equal and opposite radially directed forces. It is further to be noted that the construction and arrangement is such that the holders 28 and rub shoes 26 may undergo limited rotation relative to the shaft 10 without producing any substantial change in the forces exerted upon the rub shoes and further without disturbing the balanced forces to which the shaft 10 is subjected.

Referring to Figure 3, a block 102 is supported between the parallel rods 46 by means of a threaded screw element 104 penetrating these shafts. Threadedly secured to the block 102 is an arm 106 connecting, as illustrated in Figure 1, to a torque measuring device 108 fixedly mounted to the supporting base 14. The torque measuring device 108 is of the conventional displacement type wherein an electrical signal is produced, this signal being proportional to the linear displacement of the arm 106 away from a predetermined equilibrium position. The electrical signal thus obtained may be monitored with a suitable recording device and/or connected to a visual meter for periodic observation. The torque measuring device and associated recording equipment may be of any conventional type. The apparatus may further include means for recording the total revolutions of the shaft 10.

In operating this apparatus, a test race is secured to the shaft 10, as illustrated in Figure 1, and weights are placed upon the carrier 98 as desired, to produce a contact force between the rub shoes 26 and the test race 20. The shaft 10 is then set into rotation by the driving means. Upon rotation of the shaft 10 and the race 20 the sliding friction force developed between the rub shoes 26 and the race 20 appears as a tangential force tending to rotate the rub shoes 26 and, as a consequence, the holders 28 about the axis of the shaft 10. Rotation of the holders 28 is opposed by the torque measuring device 108, this torque measuring device permitting but slight rotational movement of the holders 28. The torque transmitted to the measuring device 108 is, of course, easily measurable and readily related to the tangential force to which the rub shoes 26 are subjected. Similarly, the total leverage between the weights 90 and the rub shoes 26 may be computed to ascertain the radial force to which the rub shoes 26 are subjected. The coefficient of sliding friction, which is proportional to the ratio of the tangential force to the radial force on each rub shoe, may then be computed.

It is to be noted that although the holders 28 and rub shoes 26 are permitted slight rotational motion about the shaft, the construction is such that the surface of the rub shoes 26 entering into sliding contact with the race 20 are not altered by this rotational motion. Inasmuch as the surface characteristics of the race 20 and rub shoes 26 will alter materially as these surfaces are subjected to frictional wear over long periods of time, this capacity of the apparatus for continuously measuring torque, without movement of the surfaces engaging in sliding contact from their normal wear pattern, is highly advantageous.

One of the primary functions of this apparatus is to measure the friction characteristics of a test race continuously subjected to frictional forces over long periods of time. Naturally, a considerable amount of heat will be generated in the areas of frictional contact. As an aid in dissipating the heat so generated, a plurality of radiator fins 110 are fixedly attached to the shaft 10 intermediate the clamp 36 and the race 20. These fins rotate with the shaft 10, thus facilitating movement of air between the fins for optimum cooling effect.

It is well known that temperature, humidity, the presence of oxidizing or reducing agents in the ambient atmosphere, and sample history, among other things, have a pronounced effect upon the frictional wear characteristics of a given surface. The compactness of the present apparatus makes it readily adaptable to numerous test conditions. For example, the ambient temperature may be varied for test purposes by partially enclosing the holders 28, rub shoes 26, and the end portion of the shaft 10 with a suitable oven attachment. When variations in atmospheric conditions are desired, the whole apparatus, or merely the working parts of the apparatus, may be fully enclosed in a gas tight chamber for evacuation and/or exchange of gases. A number of variations of the basic test patterns outlined are possible with the present device, as will be apparent to those skilled in the art.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An apparatus for testing the frictional characteristics of a bearing race or the like, said apparatus including means for engaging and supporting the race, means for rotating the race, a pair of rub shoes, means for supporting the rub shoes in compressive engagement with the race, the rub shoe supporting means comprising a pair of toroidal sectors arranged in the plane of said race, means supporting said sectors in substantial concentric relation to said race for limited rotary movement about said race, said last named means pivotally engaging said sectors so as to permit limited pivotal movement thereof away from the surface of said race, each said sector being provided with means for fixedly holding a rub shoe, said rub shoes being supported by said sectors at diametrically opposed positions in engagement with said race, means for applying a radially directed force to each sector for compressing said rub shoes radially against said race, and means opposing rotary movement of said sectors for determining the torque transmitted to the rub shoes upon rotation of said race.

2. An apparatus for testing the dynamic frictional properties of bearing races and the like, said apparatus including means for engaging and rotating the race, said means including a shaft coaxial with the axis of rotation adapted to receive the race, a pair of rub shoes, a holder for each said rub shoe, each said holder having the shape of a sector of an annulus and being arranged in coplanar relation with said bearing, means pivotally engaging each said holder for supporting said holders for rotation in substantial concentric relation with the race, the pivotal axis of said holders being at a fixed distance from the axis of rotation of said race, the outer peripheries of said holders occupying an arc substantially concentric with the race, said holders cooperating to hold said rub shoes in engagement with said race at diametrically opposed positions, mechanism including antifriction means bearing against the peripheries of said holders for applying diametrically opposed substantially radially directed forces to said holders to bring the rub shoes held thereby into compressive engagement with the bearing race, and means opposing rotation of said holders for measuring the torque transmitted to said holders by said rub shoes upon rotation of said race.

3. The apparatus according to claim 2 including means for dissipating the heat generated in the race by friction, said means comprising a plurality of spaced heat conductive fins secured to the race receiving shaft in spaced relation to the race.

4. The apparatus according to claim 2, wherein the means pivotally engaging each said holder for rotatably supporting said holders in substantial concentric relation with said race includes a supporting element mounted for rotation upon said race receiving shaft in spaced relation to said race, said supporting element being provided with a pair of rod receiving apertures, rods journalled in said apertures, said rods being supported by said supporting element in spaced parallel relation to said race receiving shaft, said holders being provided with rod receiving apertures, said rods being seated in said apertures such that said holders are pivotally supported by said rods, the construction and arrangement being such that said supporting element and said holders are capable of executing rotary movement about an axis coaxial with said race receiving shaft.

5. The apparatus according to claim 2, wherein the means for applying substantially radially directed forces to the peripheries of said holders includes a yoke fixedly secured in coplanar relation to said holders and provided with arms disposed on opposite sides of said holders, a lever pivotally secured intermediate its ends to each said arm, said levers being disposed in substantial parallel relation, a pair of roller bearings supported by said levers at one end thereof in rolling engagement with the peripheries of said holders, the roller bearings being supported in diametrically opposite positions relative to said race receiving shaft, and means for actuating the opposite ends of said levers oppositely so as to pivot the roller bearings carried by said levers into compressive engagement with the peripheries of said holders, said last named means including a wedge element interposed between said levers, and means for driving said wedge element between said levers so as to drive said levers oppositely, the construction and arrangement being such that said roller bearings engage said holders with equal and opposite forces.

6. An apparatus for testing the dynamic frictional properties of a cylindrical element, said apparatus including means for rotating the element, a pair of rub shoes, holders supporting said rub shoes in engagement with the periphery of the cylindrical element, said rub shoes engaging said element at diametrically opposed positions, means supporting said holders for rotation about the axis of said shaft, means supplying equal and opposite radially directed loads to said holders whereby said rub shoes compressively engage said element with equal force, means providing for rotation of said holders relative to said load applying means, and means opposing rotation of said holders for measuring the torque delivered thereto.

7. An apparatus for testing the dynamic frictional properties of bearing races and the like, said apparatus including means for engaging and rotating the race, said means including a shaft coaxial with the axis of rotation adapted to receive the race, a pair of rub shoes, a holder for each said rub shoe, each said holder having the shape of a sector of an annulus and being arranged in coplanar relation with said bearing, means pivotally engaging each said holder for supporting said holders for rotation in substantial concentric relation to the race, said last named means including a supporting element mounted for rotation upon said receiving shaft in spaced relation to said race, said supporting element being provided with a pair of rod receiving apertures, rods journalled in said apertures, said rods being supported by said supporting element in spaced parallel relation to said race receiving shaft, said holders being provided with rod receiving apertures, said rods being seated in said apertures such that said holders are pivotally supported by said rods, the outer peripheries of said holders occupying an arc substantially concentric with said race, said holders cooperating to hold said rub shoes in engagement with said race in diametrically opposed positions, means for applying diametrically opposed substantially radially directed forces to the peripheries of said holders to bring the rub shoes held thereby into compressive engagement with the bearing race, and means for measuring the torque transmitted to said holders by said rub shoes upon rotation of said race.

8. An apparatus for testing the dynamic frictional properties of bearing races and the like, said apparatus including means for engaging and rotating the race, said means including a shaft coaxial with the axis of rotation adapted to receive the race, a pair of rub shoes, a holder for each said rub shoe, each said holder having the shape of a sector of an annulus and being arranged in coplanar relation with said bearing, means pivotally engaging each said holder for supporting said holders for rotation in substantial concentric relation with the race, the outer peripheries of said holders occupying an arc substantially concentric with the race, said holders cooperating to hold said rub shoes in engagement with said race in diametrically opposed positions, a yoke fixedly secured in coplanar relation to said holders and provided with arms disposed on opposite sides of said holders, a lever pivotally secured intermediate its end to each said arm, said levers being disposed in substantial parallel relation, a pair of roller bearings supported by said levers at one end thereof in rolling engagement with the peripheries of said holders, the roller bearings being supported in diametrically opposite positions relative to said race receiving shaft, means for actuating the opposite ends of said levers oppositely so as to pivot the roller bearings carried by said levers into compressive engagement with the peripheries of said holders, said last named means including a wedge element interposed between said levers, and means for driving said wedge element between said levers so as to drive said levers oppositely, and means for measuring the torque transmitted to said holders by said rub shoes upon rotation of said race.

References Cited in the file of this patent

UNITED STATES PATENTS

| | | |
|---|---|---|
| 214,132 | Higginson | Apr. 8, 1879 |
| 1,117,187 | Hess | Nov. 17, 1914 |
| 2,110,288 | Cornell | Mar. 8, 1938 |
| 2,132,347 | Anderson | Oct. 4, 1938 |
| 2,380,796 | Schnell | July 31, 1945 |
| 2,563,769 | Wyant | Aug. 7, 1951 |